E. T. STARR.
TOOL-CARRIERS FOR DENTAL-ENGINES.

No. 173,686. Patented Feb. 15, 1876.

WITNESSES
Wm. A. Skinkle
Wm. J. Peyton

By his Attorney
W. D. Baldwin

INVENTOR
Eli T. Starr.

UNITED STATES PATENT OFFICE.

ELI T. STARR, OF PHILADELPHIA, PENNSYLVANIA, ASSIGNOR TO SAMUEL S. WHITE, OF SAME PLACE.

IMPROVEMENT IN TOOL-CARRIERS FOR DENTAL ENGINES.

Specification forming part of Letters Patent No. 173,686, dated February 15, 1876; application filed February 3, 1876.

*To all whom it may concern:*

Be it known that I, ELI T. STARR, of the city and county of Philadelphia, in the State of Pennsylvania, have invented certain new and useful Improvements in Tool-Carrier Angle Attachments, of which the following is a specification:

My invention relates to an angle attachment for dental engines, and constitutes an improvement on the one shown in Letters Patent No. 170,057, granted November 16, 1875, to Thomas Cogswell.

The prime object of my invention is to provide an attachment, such as shown in the above-mentioned patent, in which the operating tool, while working at an angle to its driving-shaft, is securely locked in its socket from accidental displacement, or from the tendency to draw out when a pulling cut is being made, and at the same time is capable of ready removal or insertion when a change of points is desired.

The subject-matter claimed will hereinafter specifically be designated.

Figure 1:
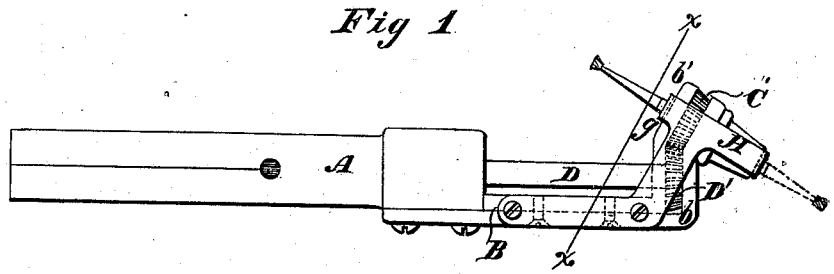
Figure 2:
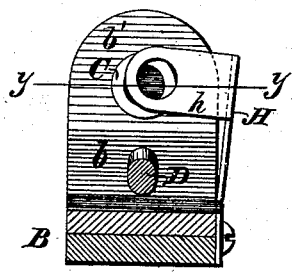
Figure 3:
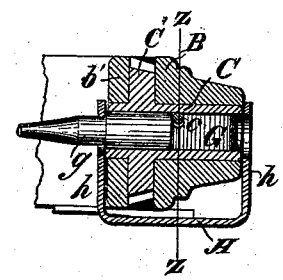
Figure 5:
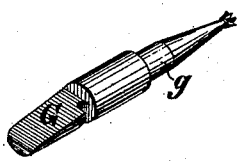
Figure 4:
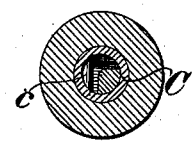

In the accompanying drawings, Figure 1 is a side view of my improved attachment; Fig. 2, a section therethrough on the line $x\ x$ of Fig. 1; Fig. 3, a section therethrough on the line $y\ y$ of Fig. 2; Fig. 4, a section therethrough on the line $z\ z$ of Fig. 3; and Fig. 5, a view, in perspective, of a tool adapted to the attachment.

A tubular portion, A, is shown as adapted for application to the hand-piece of the well-known S. S. White dental engine, and has mounted upon it, in any suitable manner, a sectional angle-arm, B, in which the rotary tool-chuck C and gearing to impart motion thereto is mounted.

Two gears, C' D', are shown in the present instance, the one, D', of which is mounted upon a driving-spindle, D, and turns in the right-angle portion $b$ of the angle-arm; and the one, C', surrounds or forms part of the socket C, and turns therewith in the laterally-inclined portion $b'$ of said arm, the two gears meshing together.

The driving-spindle D is mounted and turns in suitable bearings in the angle-arm and tubular portion A, and when the attachment is applied to use is adapted to engage with and be driven by the chuck of the hand-piece of the engine in usual well-known ways, the motion thus gained being communicated, by means of the gearing, to the chuck C, and consequently to the burr, drill, or other rotary tool carried thereby, all of which is substantially as shown in the Letters Patent aforesaid, except that therein is shown a gear intermediate between the driving-gear and chuck, which, in the present instance, I dispense with; but in some cases it may be employed with advantage.

In the Letters Patent aforesaid the rotary chuck is shown as internally threaded, to receive and hold the correspondingly-threaded shank of the tool, which construction has, in practice, been found objectionable, owing to the liability of the tools, when in operation, to unscrew and drop out.

To remedy this evil, which, in the delicate class of work to be performed, is very annoying and injurious, I positively lock the tool in the rotary socket when in operation, while allowing them to be inserted and withdrawn with ease and facility, when a change of instruments is desired, in the following manner: A pin, $c$, inserted in the socket tangential to the bore thereof, is adapted to engage with the flattened eccentrically-grooved end of the tool G to be driven, (shown in Fig. 5,) and forms a positive connection between said tool and the rotary socket as regards circumferential movement; and to prevent its longitudinal displacement when in operation the tool is provided with a reduced portion, $g$, and the shoulder thus formed is acted upon by an angular T-shaped plate-spring, H, the ends $h$ of which are bent at right angles to the main portion, so as to project or extend over both ends of the bore or opening of the socket, the said bent ends being provided with apertures, through which the tool is passed before entering the socket.

The apertures in the bent ends $h$ of the spring H, as will be seen in the drawing, (most clearly in Fig. 2,) are not concentric with the bore of the socket; but the tension of the spring keeps them slightly eccentric or out of line, whereby when a tool is inserted through the spring it (the spring) has to yield slightly, to allow the shank of the tool to pass into the socket; and as the enlarged portion of the tool-shank passes the bent portion $h$ of the spring, (which is at the moment when the tool should be turned to engage it with the tangential pin,) the spring retracts past the shoulder formed by the reduced portion of the tool, and constitutes a positive barrier against its withdrawal, except when the spring is depressed, which is the case when the tool is to be removed.

I have shown the socket as so constructed that a tool can be inserted, and will operate equally well, at either end, so that a front or back action of the tool may be obtained.

The angle at which the tool operates, relatively to the hand-piece of the engine, may be varied to a greater or less degree from that shown.

I claim as my invention—

1. The combination, substantially as hereinbefore set forth, of the angular attachment, its tool-socket, and the laterally-moving locking-spring, mounted on the attachment.

2. The combination, substantially as hereinbefore set forth, of the tool-socket and the locking-spring, surrounding its ends, whereby a tool may be applied and locked from either side.

3. The combination, substantially as hereinbefore set forth, of the tool-socket, the tangential pin, the locking-spring, and the tool-shank, provided with a groove, into which the pin takes, and a shoulder to abut against the spring, whereby the tool is prevented from either turning or moving endwise in its socket.

In testimony whereof I have hereunto subscribed my name.

ELI T. STARR.

Witnesses:
H. T. EARNEST,
E. C. DAVIDSON.